US008171399B2

(12) United States Patent
Coppedge, III et al.

(10) Patent No.: US 8,171,399 B2
(45) Date of Patent: May 1, 2012

(54) USING AN ALTERNATE USER INTERFACE TO A DRAG AND DROP INTERFACE FOR REARRANGING CONFIGURABLE WEB PAGE COMPONENTS

(75) Inventors: Thomas D. Coppedge, III, Research Triangle Park, NC (US); Becky J. Gibson, Westford, MA (US); Kevin E. Hicks, Knightdale, NC (US); Andrew J. Lahart, Arnold, MD (US); David Salinas, Pflugerville, TX (US); Michael A. Squillace, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 881 days.

(21) Appl. No.: 12/175,341

(22) Filed: Jul. 17, 2008

(65) Prior Publication Data

US 2010/0017730 A1   Jan. 21, 2010

(51) Int. Cl.
*G06F 17/00* (2006.01)
*G06F 3/00* (2006.01)

(52) U.S. Cl. ........ 715/243; 715/747; 715/760; 715/769; 715/206; 715/209; 715/234

(58) Field of Classification Search .................. 715/769, 715/827, 205, 206, 209, 234, 243, 269, 275, 715/747, 760, 780
See application file for complete search history.

(56) References Cited

U.S. PATENT DOCUMENTS

| | | | | |
|---|---|---|---|---|
| 5,845,299 A * | 12/1998 | Arora et al. | .................... | 715/209 |
| 7,216,298 B1 * | 5/2007 | Ballard et al. | ................ | 715/760 |
| 7,322,007 B2 * | 1/2008 | Schowtka et al. | .............. | 715/243 |
| 7,657,840 B2 * | 2/2010 | Gibson et al. | .................. | 715/769 |
| 7,657,844 B2 * | 2/2010 | Gibson et al. | .................. | 715/827 |
| 7,880,919 B2 * | 2/2011 | Tomita et al. | ................ | 358/1.18 |
| 7,895,570 B2 * | 2/2011 | Gibson et al. | .................. | 717/115 |
| 2002/0186248 A1 * | 12/2002 | Ramanathan et al. | ........ | 345/780 |
| 2003/0011632 A1 * | 1/2003 | Gupta et al. | ................... | 345/747 |
| 2003/0023632 A1 * | 1/2003 | Ries et al. | ...................... | 707/513 |
| 2006/0164396 A1 * | 7/2006 | Anderson | ...................... | 345/172 |
| 2006/0212806 A1 * | 9/2006 | Griffin et al. | ................. | 715/523 |
| 2007/0245236 A1 * | 10/2007 | Lee | ............................... | 715/530 |
| 2008/0109743 A1 * | 5/2008 | Gibson et al. | ................. | 715/769 |
| 2009/0282349 A1 * | 11/2009 | Olsen et al. | .................... | 715/760 |

OTHER PUBLICATIONS

"Writing Systems on Computer", Wikipedia, viewed Apr. 4, 2008.

* cited by examiner

*Primary Examiner* — Nicholas Augustine
(74) *Attorney, Agent, or Firm* — Patents on Demand P.A.; Brian K. Buchheit; Scott M. Garrett

(57) ABSTRACT

A user interface for repositioning Web page components that includes an HTML table. Each cell of the table can represents a Web page component that is able to be repositioned. Each cell can include an identifier and a user selectable position control. The identifier can identify the Web page component. The user selectable position control can accept user input designating a position of the component within the Web page. An activation control can accept input entered within the user selectable position control when selected. Activation of the activation control can result in the Web page being reconfigured so that the position of the Web page components corresponds to positions specified by the position controls. In one embodiment, the user interface can be an accessibility option for users having difficulty with a drag and drop interface.

19 Claims, 3 Drawing Sheets

Content Configuration Interface 202

| Component 230 | Current Position 232 | Available Positions | 234 |
|---|---|---|---|
| Pointer 210 | Location A | Location E ▼ | Apply |
| Zoom Tool 212 | Location B | Location C ▼ | Apply |
| Compass 214 | Location C | Location D ▼ | Apply |

Table 204

☑ Automatically adjust placement conflicts 218
☐ Order by highest importance 220
☐ Order by lowest importance 222

Content Arrangement Preview 216

| Apply All Changes 224 | Cancel |

FIG. 2

USING AN ALTERNATE USER INTERFACE TO A DRAG AND DROP INTERFACE FOR REARRANGING CONFIGURABLE WEB PAGE COMPONENTS

BACKGROUND OF THE INVENTION

The present invention relates to the field of user interfaces, more particularly to using an alternate user interface in place of a drag and drop interface for rearranging configurable Web page components.

Drag and drop interfaces are commonly used for many actions in computing sessions. A drag and drop interface is an interface in which elements on the screen are movable to a different location. The user typically first uses a pointing device (such as a mouse, drawing tablet, or trackball) to "click" or select the item to move. When selecting the item to move, the user does not release the selection mechanism (e.g., a mouse button) until the item is moved to the desired place. The most common example can be users dragging and dropping files to different locations in an operating system. Moving the files to different locations can trigger file operations such as copying, moving, or deleting (when moved to a special location such as a trash/recycle bin). Drag and drop operations are also used to configure components of a Web page.

Drag and drop interfaces can be troublesome for some users to use, such as those with visual or motor skill impairments. For a visually impaired user, it can be difficult to keep a visual map in mind of where moveable components are physically located and where they may be relocated. For a user with motor skill impairments, it may be difficult or impossible to perform the combined operations of moving the mouse and clicking the appropriate buttons.

BRIEF DESCRIPTION OF THE SEVERAL VIEWS OF THE DRAWINGS

FIG. 2 illustrates an interface for configuring a Web page in accordance with an embodiment of the inventive arrangements disclosed herein.

DETAILED DESCRIPTION OF THE INVENTION

Figure 1:
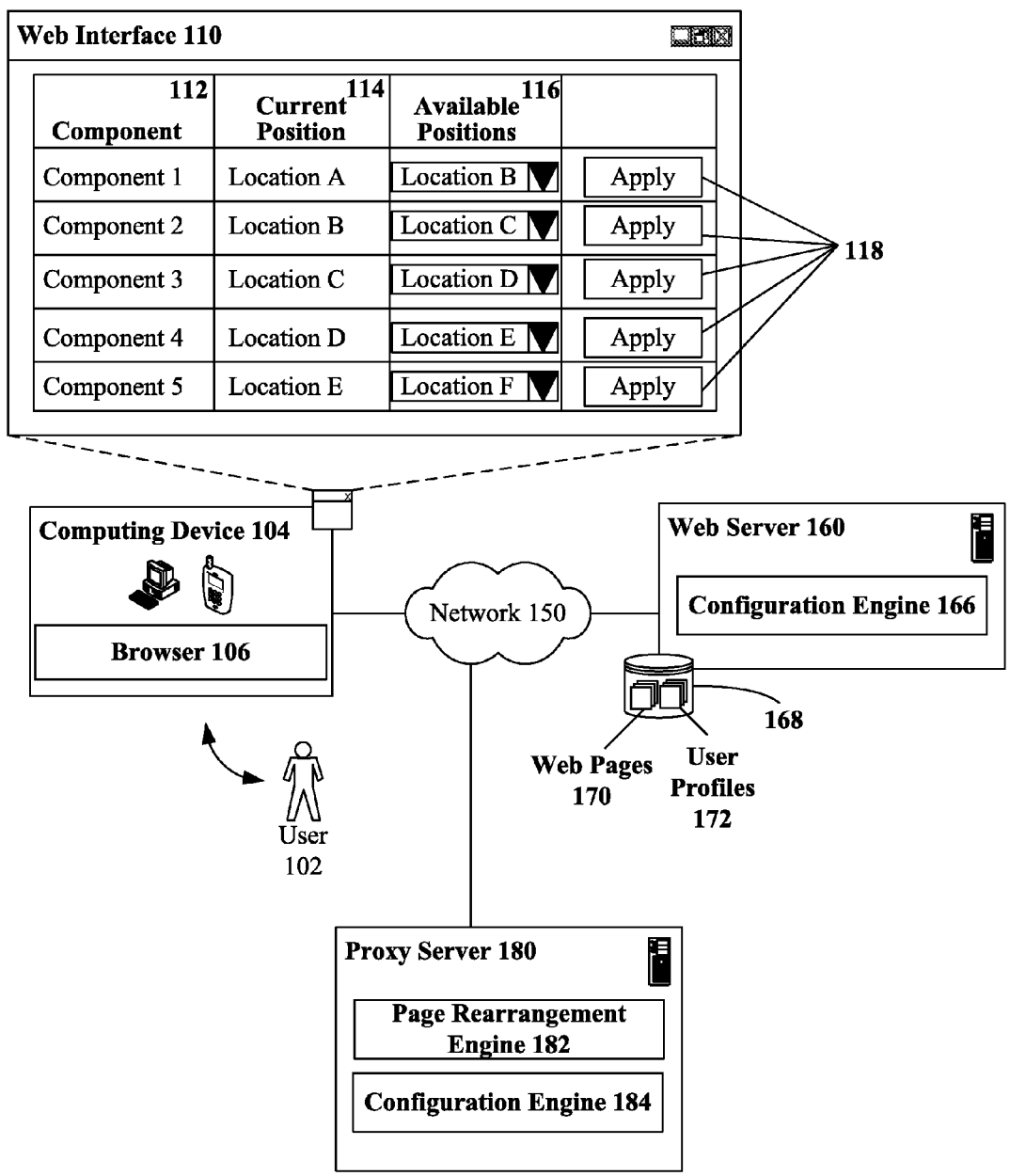
FIG. 1 is a schematic diagram of a system for an interface to configure Web pages in accordance with an embodiment of the inventive arrangements disclosed herein.

The present invention discloses a solution for users to position configurable components of a Web page. The solution can be an alternative to a drag and drop configuration function, which presents Web page elements in a Hypertext Markup Language (HTML) table and provides an ability to reposition these components. For example, a position selection control can be presented next to each component, which provides a mechanism to position the component within a Web page. The solution can be utilized by any user, but can be particularly advantageous to many disabled users, who may have difficulty utilizing a drag and drop interface.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W), digital versatile disk (DVD), Blu-ray Disc™, and the like, which includes any high definition and recordable formats of these optical disks. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages, which include markup languages (e.g., HTML, XHTML, XML, SGML, XLS, CSS) as well as scripting languages (JavaScript, ECMAScript, Python, Perl, PHP, etc.). The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram of a system 100 for an interface 110 to configure Web pages in accordance with an embodiment of the inventive arrangements disclosed herein. The interface 110 can tabularly present (or present within any HTML table) Web page components/elements, which can be repositioned using a selectable control 116. The configuration interface 110 can be used in place of or in addition to a drag and drop configuration interface, which is a standard for many customizable Web pages. The drag and drop standard can be particularly disadvantageous to many users who have relatively low vision acuity and/or motor control impairments that make using a drag and drop interface for configuring a Web page problematic. Further, the interface 110 can be used in many situations lacking convenient pointer manipulation mechanisms (e.g., mice, track pad, etc.). For example, many mobile devices, such as cellular phones, include Web access capabilities, where the devices themselves may make drag and drop motions difficult. The tabular interface 110 as presented can be used intuitively with more primitive input peripherals than a drag and drop interface would require.

In system 100, user 102 can interact with browser 106 running on computing device 104. Browser 106 can enable the interaction between user 102 and servers 160 and 180. Web server 160 can serve Web pages 170 stored on data store 168 to browser 106 for interaction with user 102. User profiles 172 can be maintained in the data store 168, which represent a set of user established settings/preferences/options to be applied to served Web pages 170. Configuration engine 166 can allow for the customization of Web pages 170. That is, a user 102 can establish/change settings in one of the profiles 172 specific to one of the served Web pages 170 using configuration engine 166. In one embodiment, the configured Web pages 170 can include a mashup, a portal, or other type of container that includes content for user 102 presentation from multiple sources, which it provides through one of the Web pages 170 having a unique Uniform Resource Identifier (URI). The Web pages 170 will generally be dynamically rendered, but can include configurable content that is relatively static, as well.

In one embodiment, the configuration engine 166 can include a page rearrangement engine 182, which permits a user 102 to configure one of the Web pages 170 using a tabular interface 110. In another embodiment, the page rearrangement engine 182 can be provided by a proxy server 180, which is able to configure the Web pages 170 and/or change settings of one of the user profiles 172. When present, the proxy server 180 can operate in a Web server 160 transparent fashion and/or can be an optional interface for configuring Web pages 170. Use of proxy server 180 can permit a user 102 to utilize a consistent tabular interface 110 for configuring Web pages 170 provided by a myriad of different Web servers 160. For example, a disabled user 102 can utilize the proxy server 180 to configure Web pages 170 through a tabular interface 110 instead of through a default drag and drop configuration interface (provided by configuration engine 166). A configuration engine 184 of the proxy server 180 can be configured to transparently interact with numerous server 160 standards, such as interacting through the GOOGLE Application Program Interface (API), the YAHOO API, and XXX.API (representing any defined and published API), and can adjust configuration settings accordingly.

Page rearrangement engine 182 can interact with user 102 and provide an interface for reconfiguring elements of one of the Web pages 170. Page rearrangement engine 182 can begin by providing user 102 with a prompt to determine which Web page user 102 would like to view. Once user 102 provides a requested Web page address (e.g., URI, domain name, etc.), page rearrangement engine 182 can use configuration engine 184 to determine the reconfigurable page components/elements of the requested page. Configuration engine 184 can interface with configuration engine 166 to determine how Web pages 170 can be reconfigured. Once the reconfigurable page components have been determined, configuration engine 184 can convey the reconfigurable elements to page rearrangement engine 182. Page rearrangement engine 182 can provide an interface to user 102, such as the example illustrated by Web interface 110, to allow user 102 to reconfigure page components in an alternative drag and drop interface. Once user 102 reconfigures the page components and submits their new settings, page rearrangement engine 182 can use configuration engine 184 to communicate the page changes to configuration engine 166. Configuration engine 166 can save the changes to one of the user profiles 172 associated with the requesting address or user.

Web interface 110 can illustrate a sample interface that proxy server 180 can provide to user 102 to reconfigure page components of one of the Web pages 170. Web interface 110 can include columns component 112, current position 114, and available positions 116. Component 112 can be a column indicating the reconfigurable component of an associated one of the Web pages 170. Current position 114 can be a column indicating the current position of the reconfigurable component of the Web page 170. Available positions 116 can be a column in which can contain a drop-down menu Graphical User Interface (GUI) control in which can list the positions the reconfigurable component can relocate to. A user can select a new location from the drop-down in available positions 116 and then select an apply button 118 to apply the setting change. It is also contemplated that applying location settings for multiple components simultaneously may cause location conflicts, requiring graceful location conflict resolution by the system.

As used herein, computing device 104 can be any computing device able to run browser 106 and communicate with servers 160 and/or 180 via network 150. Computing device 104 can allow user 102 to view and interact with Web pages 170 stored on Web server 160's data store 168. Browser 106 can be executable instruction code that can allow the viewing of Web pages 170 provided by Web server 160. Browser 106 can be a Web browser, but is not limited to a Web browser and can be any application capable of displaying content provided by servers 160 and 180. For example, browser 106 can include a rich internet interface, a Web enabled widget, and the like. Computing device 104 can include, but is not limited to, a desktop computer, laptop computer, mobile phone, a media player, an internet appliance, a game console, a kiosk, a navigation device, and/or the like.

Web pages 170 can be any Web content that contains page components that can be reconfigured. In some embodiments, Web pages 170 can include dynamic Web content that can require a language interpreter (not shown) to execute code to generate the dynamic view. Web pages 170 can be customized according to settings stored in one of the user profiles 172 associated with a user. User profiles 172 can be configuration settings that have been configured in accordance with a computing session with Web server 160. The user profiles 172 can be manually or automatically configured. For example, one of the user profiles 172 can be set in the form of a cookie stored in a client's browser such as browser 106. This cookie can automatically be set to save options for the next time the user requests the same one of the Web pages 170. User profiles 172 can also be manually configured in cases where an associated one of the Web pages 170 requires a user account or something similar. Each of the user profiles 172 can be any collection of settings for a user's session on an associated one of the Web pages 170.

Data store 168 can be physically implemented within any type of hardware including, but not limited to, a magnetic disk, an optical disk, a semiconductor memory, a digitally encoded plastic memory, a holographic memory, or any other recording medium. The data store 168 can be a stand-alone storage unit as well as a storage unit formed from a plurality of physical devices, which may be remotely located from one another. Additionally, information can be stored within each data store in a variety of manners. For example, information can be stored within a database structure or can be stored within one or more files of a file storage system, where each file may or may not be indexed for information searching purposes.

Network 150 can include any hardware/software/and firmware necessary to convey digital content encoded within carrier waves. Content can be contained within analog or digital signals and conveyed through data or voice channels and can be conveyed over a personal area network (PAN) or a wide area network (WAN). The network 150 can include local components and data pathways necessary for communications to be exchanged among computing device components and between integrated device components and peripheral devices. The network 150 can also include network equipment, such as routers, data lines, hubs, and intermediary servers which together form a packet-based network, such as the Internet or an intranet. The network 150 can further include circuit-based communication components and mobile communication components, such as telephony switches, modems, cellular communication towers, and the like. The network 150 can include line based and/or wireless communication pathways.

It should be appreciated that the Web interface 110 represents just one contemplated embodiment of reconfiguring Web components within an HTML table having unique cells for each Web component. An important factor is that the interface 110 can be manipulated utilizing input from a standard keyboard only (not requiring pointing device input). This makes interface 110 an accessibility option in one contemplated embodiment for use by users 102 having difficulty using a drag and drop interface. The positions 116 of interface can refer to Web page locations and/or offsets, but need not. For example, in one embodiment, the "positions" 116 can indicate a relative importance of an associated component, which can be mapped to an actual Web page position. For instance, components presented upon a top left point of a Web page (or a bottom right corner in other countries based upon a countries writing system) can be considered "more important" than positions further from this reference position (top-left).

FIG. 2 illustrates an interface 202 for configuring a Web page in accordance with an embodiment of the inventive arrangements disclosed herein. The content configuration interface 202 can be implemented in context of system 100. That is, content configuration interface 202 illustrates an alternate to using a drag and drop configuration interface.

In interface 202, an HTML component of a configurable Web page can be extracted as components, along with a current position, and a set of available positions. Presentation in a tabular 204 manner is contemplated, but is not a limitation of the invention. For example, in another embodiment, the table containing the HTML component (components 210-214) can be used to drive configuration of HTML components through any of a variety of interfaces. For example, each of the HTML components can be presented in a tiled fashion, where each tile includes a position adjustment control, which can be used to change a position of the element within a customizable Web page.

As shown in interface 202, table 204 can be a listing of all the reconfigurable page components of a Web page. Table 204 can include pointer 210, zoom tool 212, and compass 216. Pointer 210 can currently be in location A and it can be selected to be moved to location E. Zoom tool 212 can currently be in position B and it can be selected to be moved to location C. Compass 214 can currently be in position C and it can be selected to be moved to location D. Content arrangement preview 216 can illustrate the Web page after the selected changes are saved and the page is updated. Content arrangement preview 216 can include graphical representations of pointer 210, zoom tool 212, and compass 214 in their new locations. Interface 202 can also include button 224, which can be used by the user once they've selected new locations for all components. Activating button 224 can save all of the user's changes and update the Web page.

Content configuration interface 202 can also include options 218-222. Option 218 can toggle the enablement of automatically adjusting placement conflicts. For example, if a user selects more than one component to be moved to the same location, a placement conflict is created. In this situation, if option 218 is enabled, the location of the conflicting component can automatically be readjusted to fit the newly selected option. In other embodiments, a visual or audible indicator can be used to notify the user of a placement conflict. Options 220 and 222 can allow for the automatic placement of the reconfigurable page components. Option 220 can cause the automatic placement in order of importance, descending (highest to lowest). Option 222 can cause the automatic placement in order of importance, ascending (lowest to highest). Importance can be determined by any number of factors, including, but not limited to, how often the user has used the component, how relevant the component is to the subject of the Web page, and the like. The order of the physical positions can be determined according to the directionality of the user's writing system. For example, in some countries, top-left can be perceived as a starting position for writing, while in others, other locations can be perceived as the starting position for writing.

The Web page able to be configured through interface 202 can be any type of Web page including a set of repositionable elements. As shown in preview 216, the Web page being configured can be a Mashup that includes elements from multiple data sources that can be overlaid within the Mashup in a programmatically definable manner. In another embodiment, the Web page can include a configurable portal, a Web page design interface, and the like.

Figure 3:
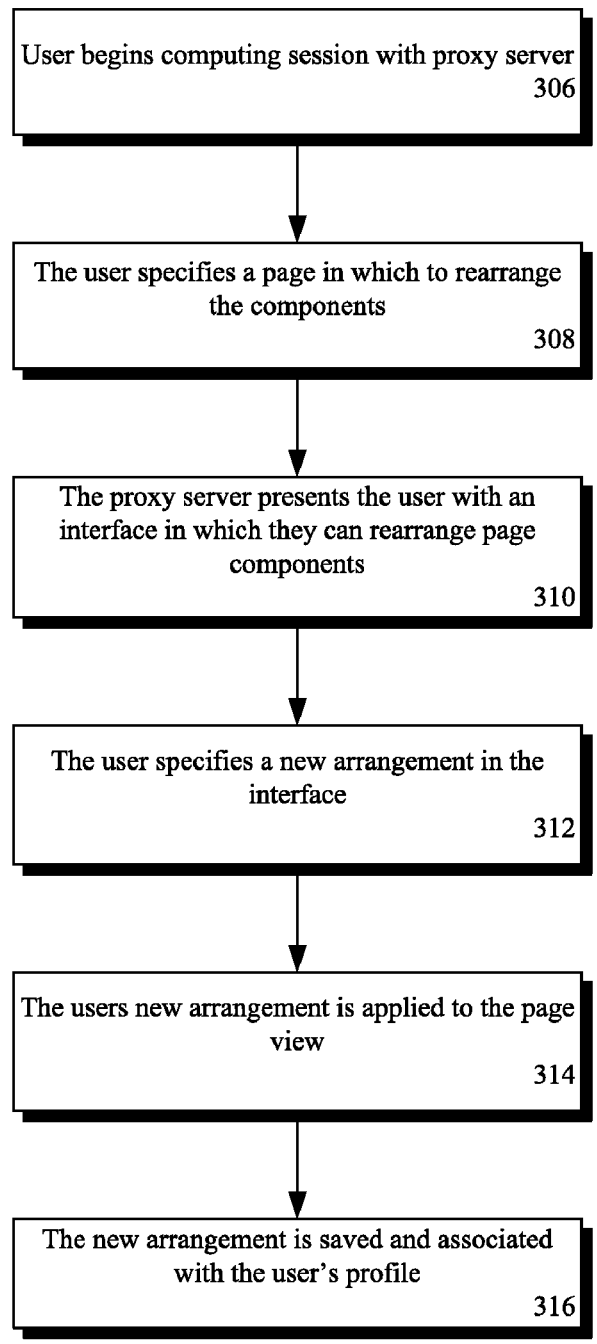
FIG. 3 is a flow chart of a method for using an alternate user interface in place of a drag and drop interface in accordance with an embodiment of the inventive arrangements disclosed herein.

FIG. 3 is a flow chart of a method 300 for using an alternate user interface in place of a drag and drop interface in accordance with an embodiment of the inventive arrangements disclosed herein. Method 300 can be performed in context of a system 100 and can begin in step 306, where a user begins a computing session with a proxy server. The proxy server is not a requirement of method 300, but is consistent with the embodiment of the invention shown in system 100.

In step 308, the user can specify a configurable Web page. In step 310, the proxy server can present the user with an interface in which they can rearrange page components in which normally would use a drag and drop interface. In step 312, the user can specify a new arrangement of the page components in the proxy server's interface. In step 314, the user's new specified arrangement can be applied to the page view. Method 300 can complete in step 316, where the new arrangement can be saved and associated with the user's profile for future sessions.

The diagrams in FIGS. 1-3 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A user interface produced by computing equipment executing program code stored in a non-transitory storage medium, said user interface being for repositioning Web page components comprising:
   an HTML table for a configurable Web page, wherein each cell of the HTML table represents a unique Web page component that is able to be repositioned on the Web page, wherein each cell of the HTML table comprises:
      an identifier for the Web page component associated with that cell; and
      a user selectable position control, wherein the position control accepts user input designating a position of the associated component within the Web page;
   an activation control configured to accept input entered within the user selectable position control when selected, wherein activation of the activation control results in the Web page being reconfigured so that a position of the unique Web page components correspond to positions designated by the user specified input associated with the user selected position control.

2. The user interface of claim 1, wherein the HTML table, the user selectable position control, and the activation control are configured so that a user is able to navigate to a cell of the HTML table, is able to specify a new position for at least one Web page component via the user selectable position control, and is able to activate the activation control all using, at the very least, input from a standard keyboard, and other additional input devices as the system deems appropriate.

3. The user interface of claim 2, wherein the HTML table, the user selectable position control, and the activation control are configured as an accessibility option for repositioning the Web page for users having difficulty utilizing a default drag and drop interface, wherein the drag and drop interface is another interface for repositioning the Web page components within the configurable Web page.

4. The user interface of claim 1, wherein the HTML table, the user selectable position control, and the activation control are configured so that a user is able to navigate to a cell of the HTML table, is able to specify a new position for at least one Web page component via the user selectable position control, and is able to activate the activation control all without utilizing input from a GUI pointer control peripheral.

5. The user interface of claim 1, further comprising:
a preview component configured to visually show the Web page as the Web page will look after a change designated by user selectable position control specified input is applied.

6. The user interface of claim 4, further comprising:
a user selectable apply change option configured to upon user selection change an arrangement of elements of the Web page in the manner shown by the preview component; and
a user selectable cancel change option configured to upon user selection cancel a change shown in the preview component and revert positions of the Web page components to original values, which are different than values reflected by the Web page displayed within the preview component.

7. The user interface of claim 1, wherein the user selectable position control is a control that provides a plurality of user selectable values, wherein each of the user selectable values represents an allowable target position for the associated HTML component.

8. The user interface of claim 7, wherein the allowable target position comprises at least one of a target location and an offset value for the Web page component.

9. The user interface of claim 7, wherein the user selectable position control is a drop-down list box.

10. The user interface of claim 1, wherein the user selectable position control provides a set of options to order the Web component on the Web page according to a relative importance of the Web components from most important to least important, wherein said values of most important to least important are translated into positions of the Web page.

11. The user interface of claim 1, further comprising:
a selectable option to toggle an enablement of a function that automatically adjusts positioning of Web page components to resolve placement conflicts when placement conflicts occur due to input provided to one of the user selectable position controls.

12. A method for configuring Web page components comprising:
identifying an HTML table for a configurable Web page, where each cell of the HTML table represents a unique Web page component that is able to be repositioned on the Web page, wherein each cell of the HTML table comprises an identifier for the Web page component associated with that cell and a selectable position control and comprises a user selectable position control configured to accept user input designating a position of an associated component within a Web page;
presenting the HTML table within a visual display;
indicating a relative level of importance of each Web page component within the Web page;
permitting a user to change an ordering of the Web page components by changing a relative level of importance of at least one Web page component;
accepting user input from a standard keyboard;
receiving a new user specified position for at least one Web page component based upon the keyboard received input;
determining a set of positions for the Web page components based upon the changed relative level of importance; and
adjusting the Web page based on the determined set of positions so that the web page components are positioned so that the Web page component is positioned in accordance with the new user specified position.

13. The method of claim 12, wherein the HTML table, the user selectable position control, and the activation control are configured as an accessibility option for repositioning components of the Web page for users having difficulty utilizing a default drag and drop interface, wherein the drag and drop interface is another interface for repositioning the Web page components within the configurable Web page.

14. The method of claim 12, further comprising:
presenting a Web page preview component configured to visually depict the Web page and the positions of the Web page components when adjusted as indicated by the new user specified position; and
providing an option to accept and to cancel the changes shown in the Web page preview component.

15. The method of claim 12, wherein the HTML table, the user selectable position control, and the activation control are configured so that a user is able to navigate to a cell of the HTML table, is able to specify a new position for at least one Web page component via the user selectable position control, and is able to activate the activation control all without utilizing input from a GUI pointer control peripheral.

16. The method of claim 12, further comprising:
receiving the new user specified position for a plurality of Web page components based upon the keyboard received input;
automatically detecting a placement conflict involving at least one new user specified positions for an associated Web page component and a position of a different Web page component;
automatically resolving the placement conflict by changing a position associated with the associated Web page component or the different Web page component;
adjusting the Web page in accordance with the positions resulting from the resolving of the placement conflict.

17. A computer program product for configuring Web page components comprising:
a non-transitory computer usable storage medium having computer usable program code embodied therewith, the computer usable program code comprising:
computer usable program code configured to identify an HTML table for a configurable Web page, where each cell of the HTML table represents a unique Web page component that is able to be repositioned on the Web page, wherein each cell of the HTML table comprises an identifier for the Web page component associated with that cell and a selectable position control and comprises a user selectable position control configured to accept user input designating a position of an associated component within a Web page;
computer usable program code configured to present the HTML table within a visual display;
computer usable program code configured to accept user input from a standard keyboard;
computer usable program code configured to receive a new user specified position for at least one Web page component based upon the keyboard received input;

computer usable program code configured to present a Web page preview component configured to visually depict the Web page and the positions of the Web page components when adjusted as indicated by the new user specified position; and computer usable program code configured to provide an option to accept and to cancel the changes shown in the Web page preview component; and computer usable program code configured to adjust the Web page so that the web page components are positioned so that the Web page component is positioned in accordance with the new user specified position.

18. The computer program product of claim 17, wherein the HTML table, the user selectable position control, and the activation control are configured as an accessibility option for repositioning components of the Web page for users having difficulty utilizing a default drag and drop interface, wherein the drag and drop interface is another interface for repositioning the Web page components within the configurable Web page.

19. The computer program product of claim 17, further comprising:

computer usable program code configured to indicate a relative level of importance of each Web page component within the Web page;

computer usable program code configured to permit a user to change an ordering of the Web page components by changing a relative level of importance of at least one Web page component;

computer usable program code configured to determine a set of positions for the Web page components based upon the changed relative level of importance; and computer usable program code configured to adjust the Web page based upon the determined set of positions.

* * * * *